Aug. 22, 1961  A. P. GIANNINI ET AL  2,997,200
WEATHER HOODS FOR FLOATING ROOFS
PROVIDED IN STORAGE TANKS

Filed July 6, 1960  2 Sheets-Sheet 1

INVENTORS
Anthony P. Giannini
Eli F. Smith
BY
Prangley, Baird Clayton,
Miller & Vogel,
ATT'YS.

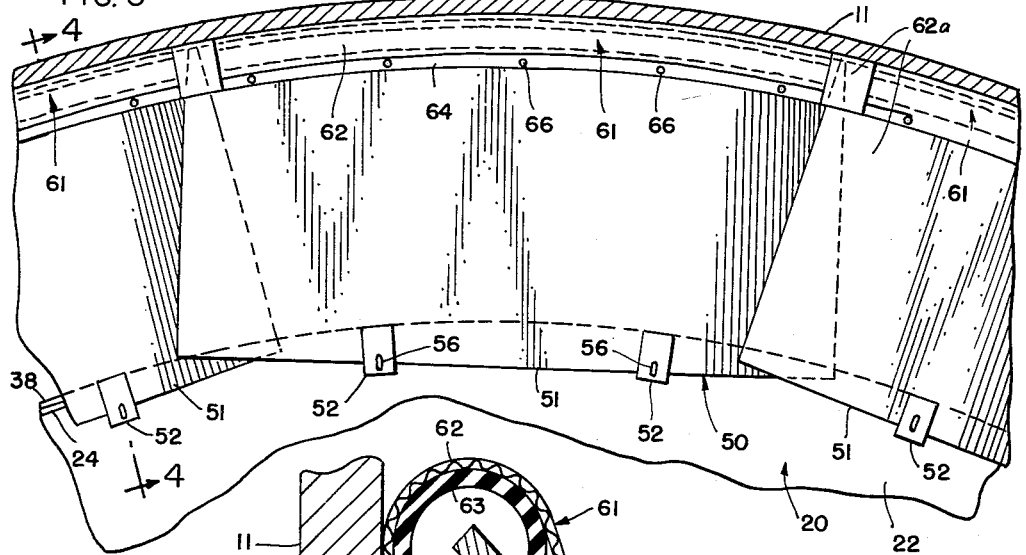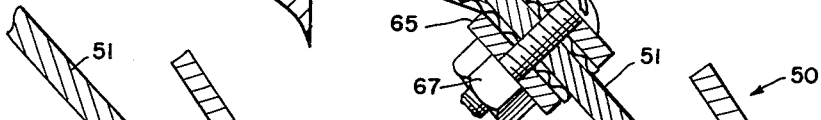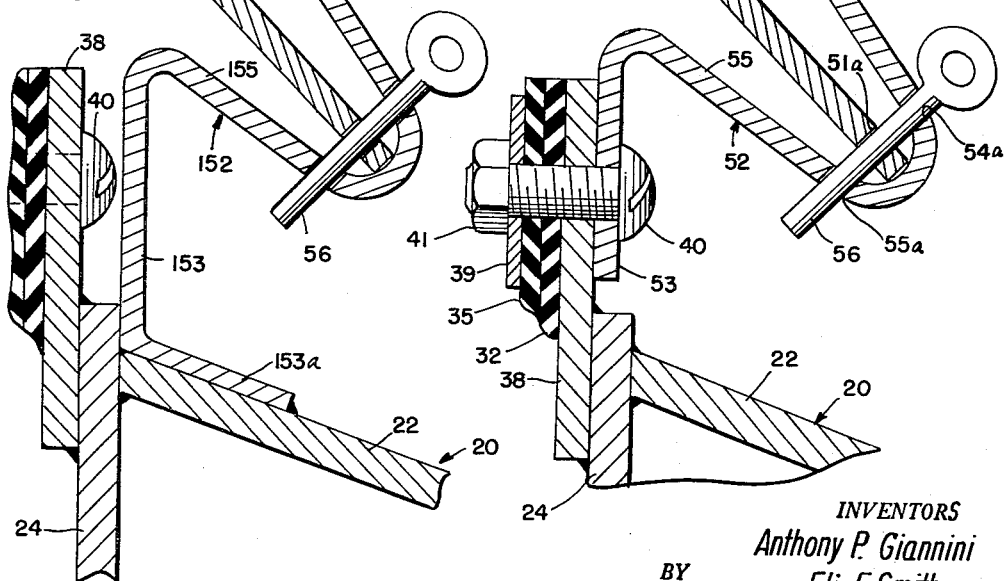

United States Patent Office 2,997,200
Patented Aug. 22, 1961

2,997,200
WEATHER HOODS FOR FLOATING ROOFS PROVIDED IN STORAGE TANKS
Anthony P. Giannini, Chicago Heights, and Eli F. Smith, Calumet City, Ill., assignors to General American Transportation Corporation, Chicago, Ill., a corporation of New York
Filed July 6, 1960, Ser. No. 41,091
7 Claims. (Cl. 220—26)

The present invention relates to weather hoods for floating roofs provided in storage tanks for petroleum products, or the like, and more particularly, to such a storage tank of the type having an upstanding substantially cylindrical side wall and provided with a floating roof carrying both sealing mechanism and the weather hood arranged in engagement with the side wall, whereby the sealing mechanism minimizes the evaporation of the stored petroleum products and the weather hood protects the sealing mechanism from the elements of the weather.

It is the general object of the invention to provide weather hood mechanism of the type noted that is of improved and simplified construction and arrangement.

Another object of the invention is to provide in a storage tank of the type noted, improved weather hood mechanism that is in constant and adequate contact with the inner surface of the side wall of the storage tank, notwithstanding substantial irregularities in the contour of the side wall.

Another object of the invention is to provide in a storage tank incorporating a floating roof and carrying sealing mechanism in the annular space between the side wall of the storage tank and the annular outer structure of the floating roof, the combination of weather hood mechanism also carried by the floating roof and positioned over the sealing mechanism in order to protect the same and arranged in surface contact with the inner surface of the side wall of the storage tank.

A still further object of the invention is to provide in the storage tank combination described, improved weather hood mechanism of composite construction and in the form of an annular array of a plurality of individual plate-like hood segments and carried by the floating roof and mounted thereupon for individual pivotal movements with respect thereto, and a composite bumper ring in the form of an annular array of a plurality of individual bumper segments respectively carried by the outer edges of the individual hood segments and disposed in sliding engagements with the side wall of the storage tank.

Further features of the invention pertain to the particular arrangement of the elements of the weather hood mechanism; whereby the above-outlined and additional operating features thereof are attained.

The invention, both as to its organization and method of operation, together with further objects and advantages thereof, will best be understood by reference to the following specification, taken in connection with the accompanying drawings, in which:

FIG. 3 is a further enlarged fragmentary plan view of a portion of the weather hood mechanism carried by the floating roof, this view being taken in the direction of the arrows along the lines 3—3 in FIG. 1;

FIG. 4 is a greatly enlarged vertical sectional view, partly broken away, of the weather hood mechanism, taken in the direction of the arrows along the line 4—4 in FIG. 3; and FIG. 5 is also a greatly enlarged vertical sectional view, similar to FIG. 4, of the weather hood mechanism, illustrating a modified form of the brackets incorporated therein for securing the hood segments to the outer annular cylindrical wall structure of the floating roof.

Figure 1:
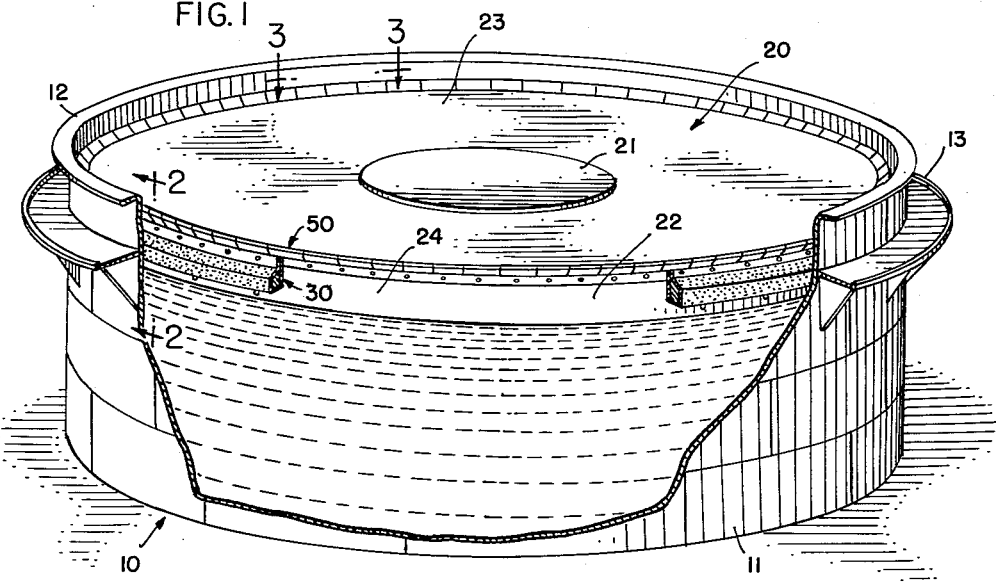
FIGURE 1 is a top perspective view, partly broken away, of a tank for storing liquids, such as petroleum products, and provided with a floating roof carrying both sealing mechanism and weather hood mechanism embodying the present invention.
Figure 2:
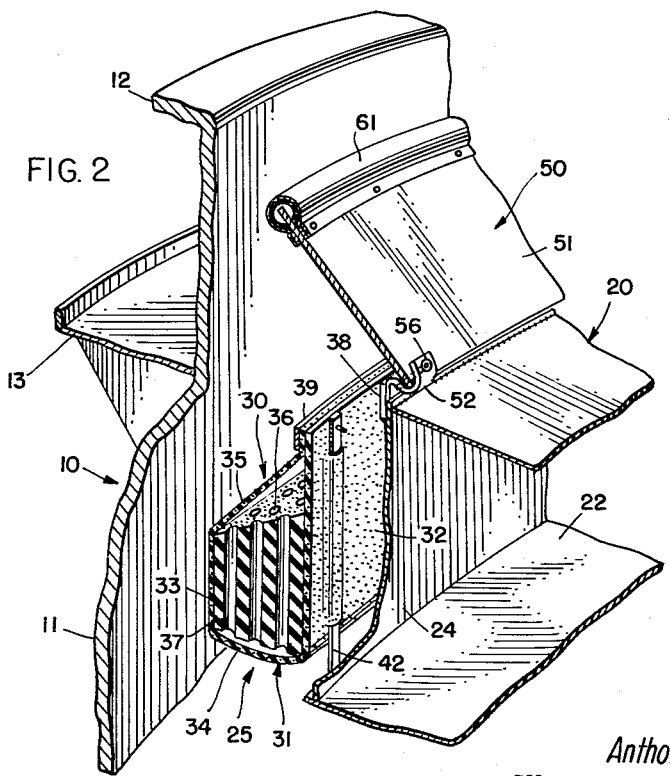
FIG. 2 is an enlarged fragmentary top perspective view of a portion of the side wall of the storage tank and an adjacent portion of the floating roof carrying both the sealing mechanism and the weather hood mechanism mentioned, this view being taken in the direction of the arrows along the line 2—2 in FIG. 1.

Referring now to FIGS. 1 and 2 of the drawings, there is illustrated a tank 10 for storing liquids, such as petroleum products, that includes an upstanding substantially cylindrical side wall 11 and provided with an open top bounded by an annular rim 12 and carrying an annular windgirder 13 arranged above the upper outer portion thereof and adjacent to and below the annular rim 12. Also, an annular roof 20 is arranged in the tank 10 in floating relation with respect to the stored liquid; whereby the floating roof 20 rises and falls with respect to the side wall 11 of the tank 10 in accordance with the head of the body of liquid stored therein. As illustrated, the floating roof 20 comprises inner annular structure defining a centrally disposed annular pontoon 21, outer annular structure defining an outer annular pontoon 22, and connecting annular structure defining a deck 23 disposed between the pontoons 21 and 22. As best shown in FIG. 2, the outer annular pontoon 22 comprises upstanding substantially cylindrical wall structure 24 spaced radially inwardly from the tank side wall 11 and defining an annular space 25 therebetween; and arranged within the annular space 25 and carried by the floating roof 20 is sealing mechanism 30 that is preferably of the construction and arrangement of that disclosed in the copending application of Frank W. Horner, Jr., Serial No. 10,431, filed February 23, 1960. Also, the roof 20 carries weather hood mechanism 50 embodying the features of the present invention.

Continuing the reference to FIGS. 1 and 2, the sealing mechanism 30 essentially comprises a hollow tubular hermetically sealed casing 31 formed of flexible sheet-like material that is impervious to the constituents of petroleum products and to water and to air, the casing 31 including an annular inner side wall 32 secured in fixed sealed engagement with the wall structure 24 adjacent to the upper portion thereof, and an annular outer side wall 33 disposed in sliding sealed engagement with the tank side wall 11, and an annular bottom wall 34 submerged in the stored liquid, and an annular top wall 35 disposed above the liquid level. In the arrangement, the casing 31 is formed of flexible sheet-like synthetic organic resinous material; and preferably, this sheet material comprises the synthetic rubber composition sold commercially under the name "Ensolite Type M" by the U.S. Rubber Company. Specifically, this synthetic rubber composition comprises nitrile rubber modified by polyvinyl chloride resin, the composition containing by weight about 75% of the nitrile rubber; in turn, the nitrile rubber comprises copolymers of butadiene and acrylonitrile, the butadiene content ranging from about 55% to 80% by weight. This synthetic rubber composition is of the closed-cell type and is of a tough cellular construction having the general appearance of foamed rubber. Moreover, the composition is capable of vulcanization in a manner entirely similar to that of natural rubber, but shows superior resistance to oils and solvents in general, and withstands the effects of aging, abrasion and heat much better than natural rubber. Also, this synthetic rubber composition is superior to natural rubber with respect to minimizing swelling thereof in the presence of petroleum products.

Also, the sealing mechanism 30 comprises an annular body 36 of resilient material that is enclosed within the casing 31, which body 36 is essentially in the form of a block of synthetic organic resin of open-cell structure, and preferably comprises a block of foamed polyurethane. In order to predetermine the compression of the block 36 of resilient material, a plurality of radially spaced-apart annular rows of upstanding openings 37 are formed therein, the individual openings 37 in each row being arranged in circumferentially spaced-apart relation. In the arrangement, the block 36 occupies a major fraction of the volume of the casing 31; and specifically, the block 36 may occupy about 80% of the total volume of the casing 31. Furthermore, the total porosity of the block 36 is about 80%; whereby the total gas space within the casing 31 is about 85% of the total volume thereof. In the arrangement, the block 36 extends between the inner upstanding annular wall portion 32 and the outer upstanding annular wall portion 33 and serves as a resilient cushion located therebetween, the inner and outer upstanding faces of the block 36 being suitably cemented to the adjacent faces of the wall portions 32 and 33 by intervening layers of cement, not shown; whereby the opposed inner and outer upstanding faces of the block 36 are intimately united by the cement layers respectively to the adjacent surfaces of the wall portions 32 and 33 of the casing 31. On the other hand, the bottom face of the block 36 is not secured to the adjacent bottom wall portion 34 of the casing 31, so that the bottom wall portion 34 is free to move with respect to the bottom surface of the block 36; and likewise, the upper face of the block 36 is spaced well below the adjacent top wall portion 35 of the casing 31. Accordingly, the principal gas pocket is formed in the upper portion of the casing 31 above the block 36 and directly communicating with the upper ends of the upstanding openings 37 provided through the block 36. The principal gas pocket mentioned defined in the casing 31 is ordinarily filled with air, which, of course, permeates the structure of the porous block 36, since it is of open-cell construction, as previously noted.

The sealing mechanism 30 is retained in its mounted position upon the adjacent wall structure 24 of the floating roof 20 by an arrangement including an upstanding annular ring 38 rigidly secured to the extreme upper end of the upstanding wall structure 24, as by welding, as best shown in FIG. 4; and to this annular ring 38 the sealing mechanism 30 is detachably secured by an arrangement also including another surrounding annular ring 39 and a series of circumferentially spaced-apart bolts 40 provided with cooperating nuts 41. In the arrangement, the extreme upper end of the inner wall portion 32 and the extreme upper end of the top wall portion 35 of the casing 31 are disposed in facing engagement with each other and positioned between the clamping rings 38 and 39 and held securely together in clamped relation therebetween, so that the hollow casing 31 is hermetically sealed, as previously noted. Also, in the arrangement, the sealing mechanism 30 is retained in place by an arrangement including a number of upstanding circumferentially spaced-apart stays or bars 42 secured to the outer surface of the wall structure 24, as best shown in FIG. 2. Specifically, each of the upstanding stay bars 42 penetrates the upper portion of the inner annular wall portion 32 just below the adjacent clamping ring 38 and also penetrates the junction between the inner annular wall portion 32 and the bottom wall portion 34; whereby the upper and lower ends of each of the stay bars 42 is disposed exteriorly of the casing 31, while the intermediate portion of each of the stay bars 42 is, in fact, disposed within the casing 31. Furthermore, the openings in the casing 31 through which each of the stay bars 42 projects are suitably sealed, so as to preserve the hermetic sealing of the hollow casing 31. Further, the lower end of each of the stay bars 42 projects through a loop-like member, not shown, secured, as by welding, to the outside lower surface of the adjacent wall structure 24, the loop-like members mentioned being circumferentially spaced-apart and positioned below the bottom wall portion 34 of the casing 31. In the arrangement, the extreme upper ends of the stay bars 42 are secured in place in a suitable manner, not shown, to the annular ring 38.

In view of the foregoing, it will be understood that as the floating roof 20 rises and falls in the tank 10, it carries therewith the sealing mechanism 30 filling the annular space 25 between the upstanding wall structure 24 of the pontoon 22 and the cylindrical tank side wall 11 and maintaining a seal therebetween, so as to minimize the evaporation of petroleum products from the body thereof stored in the tank 10. Moreover, the stay bars 42 prevent the hollow casing 31 from rolling upwardly with respect to the wall structure 24 incident to downward movement of the floating roof 20 with respect to the tank side wall 11 and maintains the inner annular wall portion 32 of the hollow casing 31 firmly pressed into fixed sealed engagement with the adjacent upstanding wall structure 24 of the pontoon 22. Also, the resilient block 36 maintains the outer annular wall portion 33 in firm sliding sealed engagement with the tank side wall 11 in the vertical movements of the floating roof 20 with respect to the tank side wall 11. Further, the securing of the inner and outer wall portions 32 and 33 of the hollow casing 31 to the adjacent faces of the block 36 prevents respective slippages therebetween incident to the vertical movements of the floating roof 20 with respect to the tank side wall 11. Furthermore, the resiliency of the block 36 maintains firm compression between the opposed wall portions 32 and 33 of the hollow casing 31, notwithstanding substantial sidewise movements of the floating roof 20 with respect to the tank side wall 11 that occur particularly during substantial windstorms. Also, it will be understood that the porous character of the block 36 accommodates free pumping action of the air between the principal gas pocket and the body structure of the block 36 incident to expansion or contraction of a segment of the hollow casing 31 as a consequence of sidewise movements of the floating roof 20 with respect to the tank side wall 11. In the arrangement, the bottom wall portion 34 of the hollow casing 31 is maintained in submerged condition with respect to the liquid stored in the tank 10 and regardless of the vertical movements and the sidewise movements of the floating roof 20 with respect to the tank side wall 11, thereby to prevent the formation of a gas pocket in the annular space 25 disposed below the bottom wall portion 34 of the hollow casing 31, so as to minimize the fire hazard.

Referring now to FIGS. 1 to 3, inclusive, the weather hood mechanism 50 that is also carried by the floating roof 20 is of composite construction including an annular array of a plurality of individual plate-like hood segments 51, the composite weather hood 50 being pitched radially upwardly and outwardly from the floating roof 20 and over the upper portion of the wall structure 24 and over the annular space in which the sealing mechanism 30 is arranged and with the outer circumferential edge thereof disposed adjacent to the tank side wall 11 and with the inner circumferential edge thereof disposed radially inwardly of the wall structure 24. More particularly, a plurality of circumferentially spaced-apart and upwardly directed brackets 52 are carried by the annular ring 38 just above the top of the wall structure 24 and receive the inner edges of the hood segments 51, mounting the same for individual vertical pivotal movements with respect thereto, as best shown in FIG. 4. Specifically, each of the brackets 52 may be of generally Z-shaped configuration, including an arm 53 disposed in direct engagement with the adjacent inner surface of the annular ring 38 and secured in place by the annular series of bolts 40 that are employed for the purpose of securing in place the sealing mechanism 30, as previously explained. Also, each of the brackets 52 comprises an arm 54 disposed above the adjacent upper surface of the received hood segments 51, as well as a body 55 disposed below the adjacent lower portion of the received hood segment 51. In the arrangement, two of the brackets 52 may be employed for the purpose of mounting each one of the hood segments 51 upon the floating roof 20, as illustrated in FIG. 3; and moreover, the hood segments 51 are detachably secured in place by a plurality of locking pins 56 respectively carried by the brackets 52. More particularly, each of the locking pins 56 extends through a pair of aligned holes 54a and 55a respectively provided in the portions 54 and 55 of the associated bracket 52 and also through an aligned hole 51a provided in the associated hood segment 51 adjacent to the inner edge thereof that is received between the elements 54 and 55 of the bracket 52.

In the arrangement, the elements 54 and 55 of each of the brackets 52 are disposed inwardly with respect to the annular ring 38 so that the inner edge of the received hood segment 51 overhangs the floating roof 20 so as to accommodate shedding of rain water from the hood segment 51 onto the floating roof 20. The upper and lower elements 54 and 55 of each of the brackets 52 are respectively disposed on opposite sides of the received hood segment 51 adjacent to the inner edge thereof, as previously noted, and cooperate therewith to limit the vertical pivotal movements of the hood segment 51 through an angle disposed well above the horizontal and well below the vertical, thereby to prevent the hood segment 51 from being trapped between the tank side wall 11 and the wall structure 24 incident to movement of the roof 20 sidewise into a position of maximum clearance with respect to the tank side wall 11 and to prevent the hood segment 51 from folding-back onto the top of the roof 20 incident to movement of the roof 20 sidewise into a position of minimum clearance with respect to the tank side wall 11. Accordingly, it will be understood that the mounting arrangement, including the brackets 52, limits the vertical pivotal movements of the hood segments 51; while the removable locking pins 56 accommodate ready removal of the individual hood segments 51 from the composite weather hood 50 for the purpose of inspection and repair of the sealing mechanism 30 disposed therebelow.

In the arrangement of the weather hood segments 51 in the composite weather hood 50, the end edges thereof are disposed in overlapped sliding relation to render the composite weather hood continuous, while preserving relative vertical pivotal movements of the individual hood segments 51 about the inner edges thereof upon the brackets 52; and from a practical standpoint, each of the hood segments 51 may be substantially rectangular, although it is preferable that the outer edge thereof be slightly contoured so as substantially to conform to the corresponding arcuate segment of the adjacent portion of the tank side wall 11, as clearly shown in FIG. 3.

Further, the composite weather hood 50 comprises a composite bumper ring in the form of an annular array of a plurality of individual bumper segments 61 respectively carried by the outer edges of the individual hood segments 51 and disposed in sliding engagement with the tank side wall 11, as clearly shown in FIGS. 3 and 4. More particularly, each of the bumper segments 61 includes a substantially tubular flexible outer casing 62 secured to the carrying hood segment 51 in embracing relation with the outer edge thereof and disposed in sliding engagement with the adjacent portion of the tank side wall 11, as shown in FIG. 4. Also, each of the bumper segments 61 includes a yieldable inner element 63 enclosed by the outer casing 62 and imparting resiliency thereto, so as to cause the outer casing 62 to conform to the engaged adjacent portion of the tank side wall 11. In the arrangement, the inner element 63 may have a tubular configuration that is slit longitudinally to receive the adjacent outer edge of the carrying hood segment 51, and the casing 62 is tightly wrapped around the inner element 63, the inner edges of the casing 62 being suitably secured in place upon the adjacent outer portion of the carrying hood segment 51 by an arrangement including upper and lower substantially arcuate clamping members 64 and 65 secured in place by a series of bolts 66 and cooperating nuts 67, as clearly shown in FIG. 4. This arrangement of the inner element 63 within the outer casing 62 renders the bumper segment 61, as a whole, yieldable, so as to obtain conformation thereof with respect to the adjacent portion of the tank side wall 11; and also the interposition of the inner element 63 within the casing 62 prevents knifing of the outer casing 62 by the extreme outer edge of the hood segment 51 against the adjacent portion of the tank side wall 11, thereby contributing to long useful life of the bumper segment 61.

As best shown in FIG. 3, and in conjunction with the centrally disposed hood segment 51 there illustrated, the left-hand end of the casing 62 of the the bumper segment 61 terminates adjacent to the associated left-hand end of the hood segment 51, while the right-hand end 62a of the casing 62 of the bumper segment 61 projects circumferentially somewhat beyond the adjacent right-hand end of the hood segment 51; whereby the right-hand end of the casing 62a of the centrally disposed bumper segment 61 overlaps in telescopic relationship the left-hand end of the casing 62 of the adjacent right-hand bumper segment 61, and the right-hand end of the casing 62a of the left-hand bumper segment 61 overlaps in telescopic relationship the left-hand end of the casing 62 of the adjacent centrally disposed bumper segment 61.

The above described arrangement of the adjacent ends of the individual bumper segments 61 in the composite bumper ring renders the same continuous, while preserving relative vertical pivotal movements of the individual bumper segments 61 with the respectively carrying ones of the individual hood segments 51; whereby the continuity of the composite weather hood and of the composite bumper ring are preserved, notwithstanding vertical pivotal movements of the individual hood segments 51 and of the individual bumper segments 61 incident to sidewise movements of the roof 20 with respect to the tank side wall 11.

In the construction of the bumper ring segment 61, the inner resilient element 63 may comprise an appropriate length of rubber hose or other suitable resilient material, while the outer casing 62 is formed of a suitable sealing fabric. For example, the casing 62 may essentially comprise a textile sheet that is impregnated with synthetic organic resinous material, such as the previously mentioned synthetic rubber composition sold commercially under the trade name "Insulite Type M."

In view of the foregoing, it will be understood that in the composite weather hood, the continuity of both the hood segments 51 in the annular array and the continuity of the bumper ring segments 61 in the annular array are preserved, notwithstanding variable vertical pivoting movements of the individual hood segments 51 upon the cooperating pairs of brackets 52 incident to the sidewise movements of the floating roof 20 with respect to the side wall 11 of the tank 10. Of course, it will be appreciated that the composite weather hood mechanism 50 carrying the composite bumper ring in sliding engagement with the interior surface of the side wall 11 protects the annular space 25 containing the sealing mechanism 30 against the entry thereinto of rain and other elements of weather, as well as foreign materials; and moreover, the composite weather hood mechanism 50 insures that rain is shed downwardly thereover onto the underlying peripheral edge portion of the floating roof 20 and thus drained away from the protected annular space 25. The mechanism for draining the rain water from the floating roof 20 to the exterior is not disclosed in detail, since this draining mechanism may be of any suitable conventional arrangement.

Referring now to FIG. 5, there is illustrated a modification of the brackets 152 for receiving and supporting the inner edges of the hood segments 51 for the purpose of mounting the same for individual pivotal movements in the vertical direction, in the manner previously explained. Fundamentally, the brackets 152 are substantially identical to the brackets 52 described above and including the corresponding elements 153, 154 and 155. However, in this modified form of each of the brackets 152, the arm 153 carries a rearwardly projecting section 153a that is directly secured, as by welding, to the adjacent upper surface of the top wall of the associated pontoon 22 of the floating roof 20. Accordingly, in this modified form of the brackets 152, the same are rigidly secured to the top of the pontoon 22 adjacent to the cylindrical wall structure 24 and inwardly of the annular ring 38 and independently of the bolts 40 that are employed for securing in place the sealing mechanism 30, in the manner previously explained.

The general mode of operation of the weather hood incorporating the modified brackets 152 is the same as that previously described in conjunction with the brackets 52, and is not repeated in the interest of brevity.

In view of the foregoing, it is apparent that there has been provided in a tank for storing liquids, such as petroleum products, and incorporating a floating roof, an improved arrangement of both sealing mechanism and weather hood mechanism, wherein the weather hood mechanism protects the sealing mechanism against the elements of weather, and wherein both the sealing mechanism and the weather hood mechanism accommodate relative vertical movements and sidewise movements of the floating roof with respect to the side wall of the storage tank, while preserving the continuity of both the sealing mechanism and the weather hood mechanism, notwithstanding substantial sidewise movements of the floating roof with respect to the side wall of the storage tank.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a tank for storing liquids, such as petroleum products, including an upstanding substantially cylindrical side wall, and a floating roof arranged in said tank and including upstanding substantially cylindrical wall structure spaced radially inwardly from said side wall and defining an upstanding substantially annular space therebetween; sealing mechanism for said space comprising a substantially annular sealing element arranged in said space and attached to said roof and movable therewith with respect to said side wall, said sealing element including an annular inner portion disposed in fixed sealed engagement with said wall structure and an annular outer portion disposed in sliding sealed engagement with said side wall, said sealing element being sufficiently radially yieldable to maintain said annular outer portion thereof in firm sealed engagement with said side wall during both vertical movements and sidewise movements of said roof with respect to said side wall; weather hood mechanism for said space comprising a composite weather hood in the form of an annular array of a plurality of individual plate-like hood segments and carried by said roof and movable therewith with respect to said side wall, said composite weather hood being pitched radially outwardly and upwardly from said roof and over the upper portion of said wall structure and over said space and with the outer circumferential edge thereof disposed adjacent to said side wall and with the inner circumferential edge thereof disposed radially inwardly of said wall structure, a plurality of circumferentially spaced-apart and upwardly directed brackets carried by said wall structure adjacent to the upper portion thereof and receiving the inner edges of said hood segments and mounting the same for individual vertical pivotal movements with respect thereto, the adjacent end edges of said individual hood segments being arranged in overlapped sliding relation in said composite weather hood to render the same continuous while preserving relative vertical pivotal movements of said individual hood segments about the inner edges thereof upon said brackets, and a composite bumper ring in the form of an annular array of a plurality of individual bumper segments respectively carried by the outer edges of said individual hood segments and disposed in sliding engagement with said side wall, the adjacent ends of said individual bumper segments being arranged in overlapped sliding relation in said composite bumper ring to render the same continuous while preserving relative vertical pivotal movements of said individual bumper segments with the respectively carrying ones of said individual hood segments, whereby the continuity of said composite weather hood and of said composite bumper ring are preserved notwithstanding vertical pivotal movements of said individual hood segments and of said individual bumper segments incident to sidewise movements of said roof with respect to said side wall.

2. The tank combination set forth in claim 1, wherein each of said brackets includes upper and lower structures respectively disposed on opposite sides of the received one of said hood segments adjacent to the inner edge thereof and cooperating therewith to limit the vertical pivotal movements of said one hood segment through an angle disposed well above the horizontal and well below the vertical, thereby to prevent said one hood segment from being trapped between said side wall and said wall structure incident to movement of said roof sidewise into a position of maximum clearance with respect to said side wall and to prevent said one hood segment from folding back onto the top of said roof incident to movement of said roof sidewise into a position of minimum clearance with respect to said side wall.

3. The tank combination set forth in claim 1, and further comprising a plurality of locking pins respectively removably carried by said brackets and cooperating with said hood segments mounted thereupon, said locking pins accommodating the vertical pivotal movements of said hood segments in their mounted positions upon said brackets and also facilitating ready placement and removal of the individual ones of said hood segments.

4. In a tank for storing liquids, such as petroleum products, including an upstanding substantially cylindrical side wall, and a floating roof arranged in said tank and including upstanding substantially cylindrical wall structure spaced radially inwardly from said side wall and defining an upstanding substantially annular space therebetween; sealing mechanism for said space comprising a substantially annular sealing element arranged in said space and attached to said roof and movable therewith with respect to said side wall, said sealing element including an annular inner portion disposed in fixed sealed engagement with said wall structure and an annular outer portion disposed in sliding sealed engagement with said side wall, said sealing element being sufficiently radially yieldable to maintain said annular outer portion thereof in firm sealed engagement with said side wall during both vertical movements and sidewise movements of said roof with respect to said side wall; weather hood mechanism for said space comprising a composite weather hood in the form of an anular array of a plurality of individual plate-like hood segments and carried by said roof and movable therewith with respect to said side wall, said composite weather hood being pitched radially outwardly and upwardly from said roof and over the upper portion of said wall structure and over said space and with the outer circumferential edge thereof disposed adjacent to said side wall and with the inner circumferential edge thereof disposed radially inwardly of said wall structure, means including a plurality of circumferentially spaced-apart brackets carried by said wall structure adjacent to the upper portion thereof for mounting said hood segments for individual vertical pivotal movements with respect to said wall structure, the adjacent end edges of said individual hood segments being arranged in overlapped relation in said composite weather hood to render the same continuous while preserving relative vertical pivotal movements of said individual hood segments with respect to said wall structure, and a composite bumper ring in the form of an annular array of a plurality of individual bumper segments respectively carried by the outer edges of said individual hood segments and disposed in sliding engagement with said side wall, each of said bumper segments being substantially tubular in lateral cross-section and secured to the carrying one of said hood segments in embracing relation with the outer edge thereof, the adjacent ends of said individual bumper segments being arranged in telescoped sliding relation in said composite bumper ring to render the same continuous while preserving relative vertical pivotal movements of said individual bumper segments with the respectively carrying ones of said individual hood segments, whereby the continuity of said composite weather hood and of said composite bumper ring are preserved notwithstanding vertical pivotal movements of said individual hood segments and of said individual bumper segments incident to sidewise movements of said roof with respect to said side wall.

5. In a tank for storing liquids, such as petroleum products, including an upstanding substantially cylindrical side wall, and a floating roof arranged in said tank and including upstanding substantially cylindrical wall structure spaced radially inwardly from said side wall and defining an upstanding substantially annular space therebetween; weather hood mechanism for said space comprising a composite weather hood in the form of an annular array of a plurality of individual plate-like hood segments and carried by said roof and movable therewith with respect to said side wall, said composite weather hood being pitched radially outwardly and upwardly from said roof and over the upper portion of said wall structure and over said space and with the outer circumferential edge thereof disposed adjacent to said side wall and with the inner circumferential edge thereof disposed radially inwardly of said wall structure, means including a plurality of circumferentially spaced-apart brackets carried by said wall structure adjacent to the upper portion thereof for mounting said hood segments for individual vertical pivotal movements with respect to said wall structure, the adjacent end edges of said individual hood segments being arranged in overlapped sliding relation in said composite weather hood to render the same continuous while preserving relative vertical pivotal movements of said individual hood segments with respect to said wall structure, and a composite bumper ring in the form of an annular array of a plurality of individual bumper segments respectively carried by the outer edges of said individual hood segments and cooperating with said side wall to prevent the entry of foreign material into said space, each of said bumper segments including a substantially tubular flexible outer casing secured to the carrying one of said hood segments in embracing relation with the outer edge thereof and disposed in sliding engagement with the adjacent portion of said side wall, also each of said bumper segments including a yieldable inner element enclosed by the outer casing thereof and imparting resiliency thereto so as to cause the same to conform to the engaged adjacent portion of said side wall, the adjacent ends of the outer casings of said individual bumper segments being arranged in telescoped sliding relation in said composite bumper ring to render the same continuous while preserving relative vertical pivotal movements of said individual bumper segments with the respectively carrying ones of said individual hood segments, whereby the continuity of said composite weather hood and of said composite bumper ring are preserved notwithstanding vertical pivotal movements of said individual hood segments and of said individual bumper segments incident to sidewise movements of said roof with respect to said side wall.

6. The tank combination set forth in claim 5, wherein the inner element enclosed in the outer casing of each of said bumper segments is of hollow tubular configuration and is positioned to prevent the outer edge of the carrying one of said hood segments from direct engagement with the enclosing outer casing thereof.

7. The tank combination set forth in claim 5, wherein the material of the outer casing of each of said bumper segments is formed essentially of copolymers of butadiene and acrylonitrile modified with polyvinyl chloride resin.

No references cited.